United States Patent [19]

Yamazaki et al.

[11] 4,068,197
[45] Jan. 10, 1978

[54] APPARATUS FOR STABILIZING BEAM FOR EXPOSURE

[75] Inventors: Taro Yamazaki; Kazuhiko Ohnishi, both of Himeji; Kiyoshi Maeda, Takatsuiki, all of Japan

[73] Assignees: Dainippon Screen Seizo Kabushiki-Kaisha, Kyoto; Ushio Electric Inc., Tokyo, both of Japan

[21] Appl. No.: 699,068

[22] Filed: June 23, 1976

[30] Foreign Application Priority Data

June 26, 1975 Japan .................................. 50-79567

[51] Int. Cl.² ............................................. H01S 3/00
[52] U.S. Cl. ............................................. 331/94.5 S
[58] Field of Search ................................... 331/94.5 S

[56] References Cited

U.S. PATENT DOCUMENTS

| 3,500,236 | 3/1970 | Clark | 331/94.5 S |
|---|---|---|---|
| 3,517,330 | 6/1970 | Doyle et al. | 331/94.5 S |
| 3,588,738 | 6/1971 | Goodwin | 331/94.5 S |
| 3,780,296 | 12/1973 | Waksberg | 250/201 |
| 3,831,108 | 8/1974 | LeFloch | 331/94.5 S |
| 4,008,444 | 2/1977 | Far et al. | 331/94.5 S |

Primary Examiner—Martin H. Edlow
Attorney, Agent, or Firm—Kleinberg, Morganstern, Scholnick & Mann

[57] ABSTRACT

An apparatus for stabilizing a laser beam to be used for exposure in an image-reproducing apparatus wherein said beam is suitably controlled by image signals obtained from the scanning of the original beam as modulated. A laser beam, after being suitably modulated by an ultrasonic light modulator, is branched out by a half mirror into two beams, one of which is to be used for exposing a photosensitive material and the other is used as a negative feedback signal. This feedback signal is then added to an image signal so that a linearity between exposing beam and image signals are greatly improved. Further, by improving the linearity of exposing beam, the stability of the exposing beam is simultaneously improved.

4 Claims, 9 Drawing Figures (A) RAMAN-NATH TYPE     (B) BRAGG TYPE

APPARATUS FOR STABILIZING BEAM FOR EXPOSURE

The present invention generally relates to an image-reproducing apparatus wherein the intensity of an exposing beam is suitably controlled by image signals obtained from the photoelectric scanning of an original image, and more particularly to an apparatus for improving and stabilizing the exposing beam.

BACKGROUND OF THE INVENTION

It is well known that a light-modulating device for controlling electric image signals in relation to a beam intensity has been playing a key role in an image-reproducing apparatus of the scanning type. As such a light-modulating device, for example, there a light modulating discharge tube has been commonly used. Quite frequently a light modulator has been utilized in combination with laser beam. When an ultrasonic modulator is utilized as such a light modulator for a laser beam, it is widely recognized that its modulation characteristic does not demonstrate a good linearity of modulated beam since the output beam intensity is not directly proportional to the level of input signals. Further, it has been pointed out as a fatal drawback that it is is very difficult to obtain a stable modulated beam, since the laser beam source itself is very likely to fluctuate.

These problems with respect to the linearity and the stability of modulated beam have heretofore been dealt with separately. For instance, in order to improve the linearity, a functional transducer has been commonly used wherein the synthesized approximation is carried out by a diode or the like has been commonly used. In this method, however, it has turned out to be difficult to make suitable adjustments and it is extremely susceptible to the change of temperature.

On the other hand, the improvement of the stability has usually been carried out either by stabilizing the laser beam source itself or by feeding two kinds of ultrasonic waves to the ultrasonic modulator; one of such ultrasonic waves is to be used for modulating the laser beam while the other is used as a negative feedback signal for securing the stability so as to curb the fluctuation of the laser beam source.

However, these known methods naturally require very complicated apparatus, which are therefore very expensive ones. Particularly in the latter method, not only is it necessary to feed two kinds of ultrasonic waves to the modulator but also to provide separate optical systems for picking up a modulated beam used for reproduction and another beam used for the negative feedback signal. These necessities, needless to say, will make the optical systems and a drive circuit of the light modulator more complex, and, what is more, the problem as to the linearity of a modulated beam still remains unsolved.

Therefore, the prime object of the present invention is to provide an apparatus for improving the stability and simultaneously the linearity of a modulated beam with respect to image singals, which beam is to be used as the exposing beam in the reproduction of an original image.

BRIEF DESCRIPTION OF THE DRAWINGS

In order that the present invention may be better understood, a preferred embodiment of the invention will now be described in detail with reference to the accompanying drawings, in which.

DETAILED DESCRIPTION OF THE INVENTION

Figure 1:
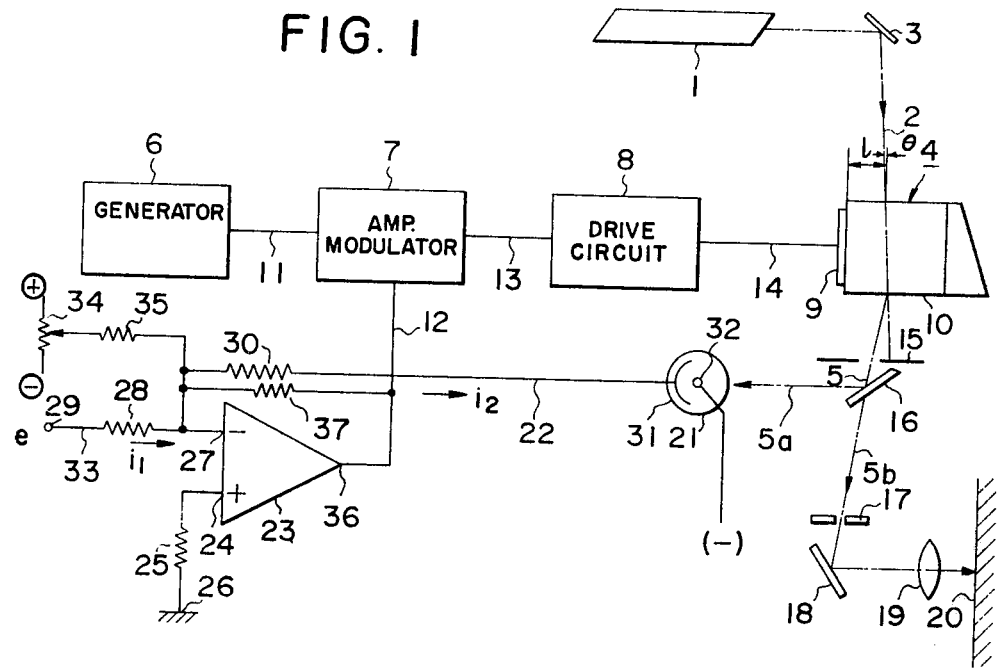
FIG. 1 is a fundamental block diagram of one embodiment of the invention.

Referring first to FIG. 1, laser beam 2 of uniform energy, being emitted from a laser beam source 1 and reflected on a mirror 3, enters ultrasonic light modulator 4 which serves to diffract the incident beam 2. As is well known in this case, a diffraction phenomenon of the beam caused by ultrasonic waves may be categorically classified into Raman-Nath Type diffraction and Bragg Type reflection depending upon an incident angle of the beam.

Figure 2:
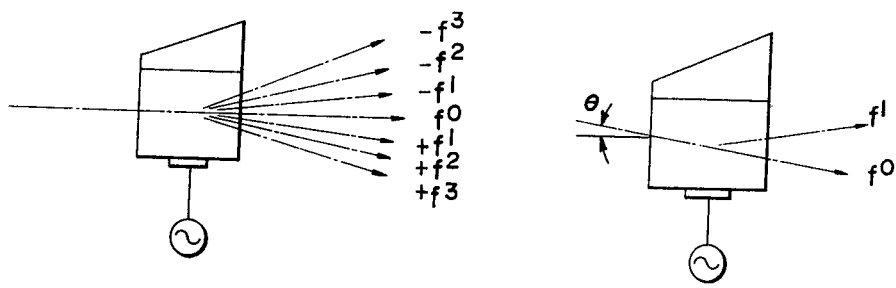
FIG. 2 comprises FIGS. 2A and 2B, schematically showing Raman-Nath Type diffraction and Bragg Type reflection respectively, FIG. 3 comprises FIGS. 3A and 3B, graphically showing modulation characteristics of Raman-Nath Type diffraction and Bragg Type reflection shown in FIG. 2, FIG. 4 also comprises FIGS. 4A, 4B and 4C, graphically showing the interrelationships among wave forms of an image signal, a feedback signal, a differential signal and the instensity of a modulated beam.
Figure 3:
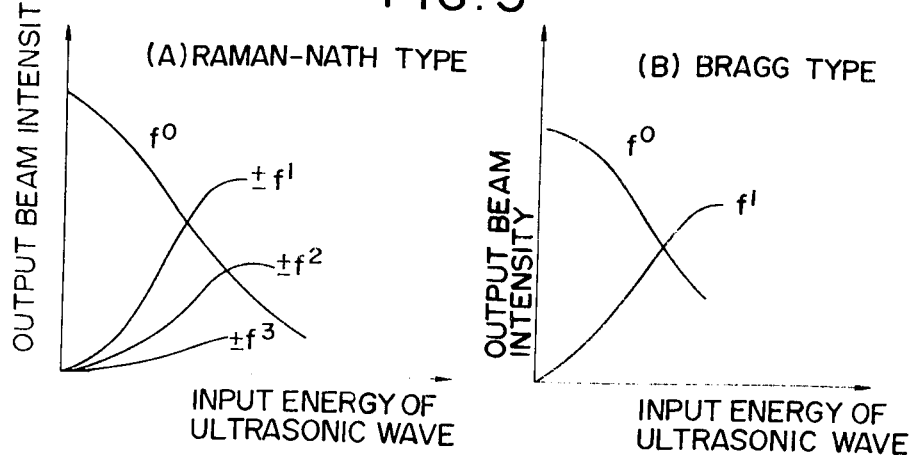

FIG. 2 comprises FIGS. 2A and 2B showing Raman-Nath Type diffraction wherein the laser beam fed into the ultrasonic light modulator is divided into diffracted beams of various order, and showing a Bragg Type reflection wherein a laser beam having an incident angle $\theta$ is reflected at an angle $\theta$. FIG. 3, also comprising FIGS. 3A and 3B, graphically illustrates the relationship between the supplied ultrasonic energy — that is, its oscillation amplitude — and the intensity modulation of diffracted laser beams in a Raman-Nath Type or in a Bragg Type. From FIG. 3, it will be apparent that in either case the intensity modulation of the diffracted beam is not directly proportional to the ultrasonic input energy; in other words, the linearity of diffracted beam with respect to supplied ultrasonic energy is far from being perfect. As has been referred to before, the main object of the invention therefore is to improve the linearity so as to obtain the stability of an exposing beam.

According to one preferred embodiment of the invention, laser beam 2 which enters the ultrasonic light modulator 4 has an incident angle $\theta$ with respect to the ultrasonic wave surface and its first-order diffracted beam ($f^1$) is utilized for the purpose which will be described hereinafter.

Ultrasonic waves for modulating laser beam 2, generated from a sine wave generator 6, goes through an amplitude modulator 7 and a drive circuit 8 from which are generated output signals for driving an ultrasonic vibrator 9 attached to the ultrasonic light modulator 4, and are thence fed into the ultrasonic wave transmitting medium 10.

An ultrasonic wave, namely a sine wave which is generated from the sine wave generator 6 with given frequency of constant amplitude, appears as carrier 11 fed into an amplitude modulator 7. The carrier amplitude is then suitably modulated according to a modulation signal 12 from an operational amplifier 23. The thus modulated carrier 11 becomes an AM modulated wave 13, which thereafter is electrically amplified by the drive circuit 8. The electric output 14 therefrom is adapted to actuate the ultrasonic vibrator 9 according to the amplitude alteration of AM modulated waves 13.

Thus, it will be understood that the modulation signal 12 fed into amplitude modulator 7 effects the amplitude control of ultrasonic waves to be supplied to ultrasonic wave transmitting medium 10 so that the intensity of the first-order diffracted beam (f¹) is suitably modulated.

The diffracted beams pass from the light modulator 4. Only the most intense one of these beams is picked up by an aperture plate 15. Thus the picked-up modulated beam 5 is further branched out by a half mirror 16 into two modulated beams 5a and 5b to be used eventually as a feedback signal 5a and as exposing beam 5b, respectively. Modulated beam 5b travels along its optical path including a slit 17, a mirror 18 and a focusing lens 19 and is projected onto the surface of a recording film 20.

On the other hand, another modulated beam 5a is photoelectrically converted by a phototube 21 and is fed back as a negative feedback signal 22 into the first-part circuit of amplitude modulator 7. The modulation signals 12, according to one embodiment of the invention, are output from a comparison circuit utilizing an operational amplifier 23; said comparison circuit being an adder-type in which a non-inverting input terminal 24 of operational amplifier 23 is grounded to a common earthing or ground line 26 through a resistor 25 so as to position a summing point at an inverting input terminal 27.

This inverting input terminal 27 is in connection with an image signal input terminal 29 through a resistor 28 and further with anode 31 of the phototube 21 through a resistor 30. Cathode 32 of the phototube 21 is connected to a negative electric source of required potential difference with respect to the common earthing line 26. This, when an image signal 33 of positive value is applied to the image signal input terminal 29, a current ($i_1$), the magnitude of which depends upon a voltage ($e$) of the image signal 33 and resistance value of resistor 28, flows into the summing point, that is, the inverting input terminal 27. Further, a photoelectric current ($i_2$) which has been transduced from modulated beam 5a at the phototube 21 also flows through the inverting input terminal 27. The comparison circuit, in this instance, functions as a device for controlling modulation signals 12 output from operational amplifier 23 so as to make equal the current ($i_1$) of image signals 33 and the photoelectric current ($i_2$) from phototube 21.

There are further provided, in accordance with the invention, an offset circuit comprising a variable resistor 34 and a resistior 35 which serves to offset dark currents generated within phototube 21 when an image signal 33 is zero.

With the foregoing descriptions in mind, it will be appreciated that a directly-proportional relationship can be established between image signals 33 and the feedback modulated beam 5a since the currents ($i_1$) of image signals 33 and the photoelectric currents ($i_2$) converted from modulated beam 5a are always kept equal to each other by modulation signals 12, and therefore a directly-proportional relationship is similarly established between the image signals 33 and another modulated beam 5b to be utilized as exposing beam since both the modulated beam 5a and 5b are branched out from diffracted beam 5 in a predetermined ratio.

What should be noted in this case is that the above-mentioned relationship between image signals 33 and modulated beam 5b may be always stable because no external factor which otherwise might be very influential is involved in that relationship. In other words, the stable modulated beam 5b whose intensity always corresponds to image signals 33 may be obtainable irrespective of various modulation distortions or the like inherent in the amplitude modulator 7, ultrasonic light modulator 4, etc..

Figure 4:
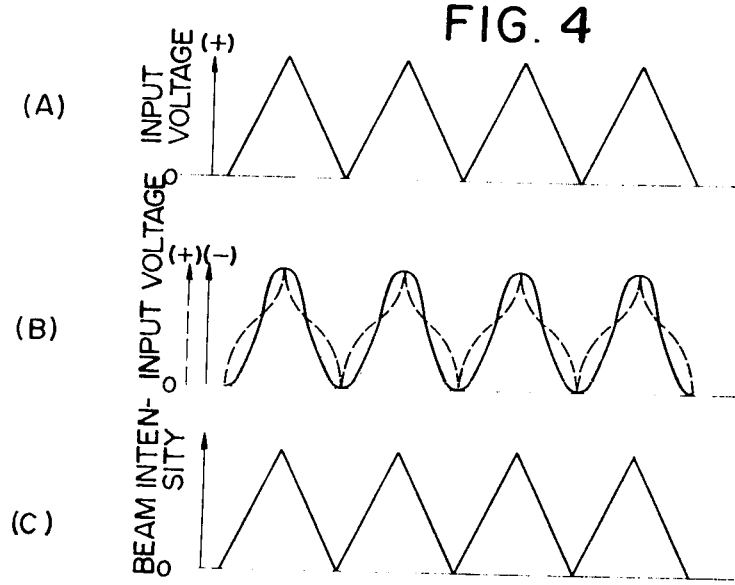
Figure 5:
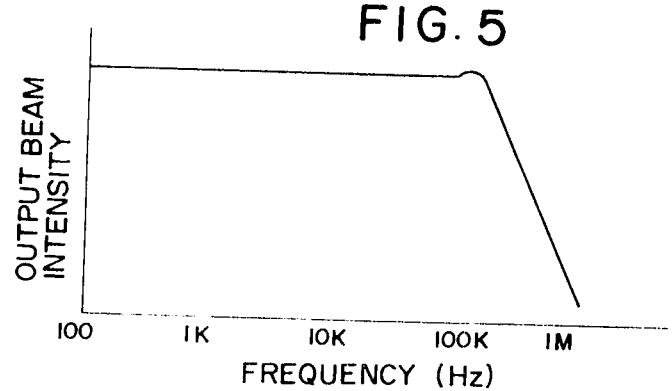
FIG. 5 is a graphical illustration of the frequency characteristic obtained according to the present invention.

The comparison circuit described hereinabove may also function as a differential amplifier when negative feedback is applied to an inverting input terminal 27 from an output terminal 36 of the operational amplifier 23 through a resistor 37. In this case, it will be easily understood that the difference between image signals 33 and feedback signals 22 may be utilized as modulation signals 12. Assuming that an initial modulated signal 12 has a delta-shaped wave for example as shown by a solid line in FIG. 4A, the resulting feedback signal 22 output from phototube 21 may have such a shaped wave, somewhat distorted, as shown by a solid line in FIG. 4B. Similarly, assuming that an image signal 33 is of the same delta shape as FIG. 4A, the resulting differential signal between the image signal 33 and the feedback signal 22 will be so shaped as to compensate for the distorted feedback signal 22, as is shown dashed line in FIG. 4B. Hence, when this differential signal is utilized as a modulation signal 12, the intensity of modulated beam 5 will be made the same as the image signal 33, as shown in FIG. 4C, so that continuous-toned images in a color original may be accurately reproduced on the film.

In the case where that the comparison circuit serves as a differential amplifier as described immediately above, it is necessary to adjust the gain of operational amplifier 23 which largely depends upon the resistance value of resistor 37; thereby balancing the relationship between the desired stability of the control loop system and the admissible non-linearity of the modulated beam.

On the other hand, it is of course preferable to employ highly-responsive amplifiers or transducers to facilitate more effective feedback control in a closed-loop system. However, the velocity of ultrasonic waves which pass through the transmitting medium 10 in the ultrasonic light modulator 4 varies with the physical property of the medium 10, and therefore a reply delay or phase delay can not be prevented. According to this invention, this kind of phase delay is compensated in such a manner that the distance "e" between a vibrator 9 and a beam path of laser beam 2 to be modulated in the medium 10 is made as short as possible so that a time required for ultrasonic waves emitted from vibrator 9 to work upon the beam 2 is equally made short. In this case, employing a material of high sound velocity as such a medium 10 will make the time even shorter.

According to the present invention, a modulatable frequency band of image signals may be increased up to 500 KH$_z$ by a rather simple structure, and the linearity as well as the stability of the exposing beam are remarkably improved.

Although there has heretofore been described a preferred emobodiment of the invention with reference to the accompanying drawings, it should be understood that various modifications and changes may be made without departing from the spirit or the scope of the invention.

What we claim is:

1. An apparatus for stabilizing beam to be used for exposure in an image-reproducing apparatus wherein said beam is controlled by image signals obtained from the scanning of a color original, said apparatus comprising;
a. a laser beam source,
b. an ultrasonic light modulator adapted to modulate laser beam emitted from said laser beam source,
c. a half mirror adapted to branch out said beam modulated by said ultrasonic light modulator into two modulated beams,
d. a photoelectric transducer adapted to photoelectrically transduce one of said two modulated beams,
e. a comparison amplifier adapted to compare output signals from said photoelectric transducer with said image signals,
f. an amplitude modulator adapted to modulate the amplitude of a sine wave of required frequency by means of output signals from said comparison amplifier, and
g. a drive circuit adapted to drive an ultrasonic vibrator attached to said ultrasonic light modulator by means of output signals from said amplitude modulator.

2. An apparatus according to claim 1, wherein there is further provided an aperture plate for picking up only the modulated beam of the strongest intensity.

3. An apparatus according to claim 1, wherein a phototube is utilized as said photoelectric transducer.

4. An apparatus according to claim 1, wherein the distance between a travelling path of said laser beam and said ultrasonic vibrator of the ultrasonic light modulator is made as short as possible; thereby lessening the possibility of a reply delay.

* * * * *

UNITED STATES PATENT OFFICE
CERTIFICATE OF CORRECTION

Patent No. 4,068,197    Dated January 10, 1978

Inventor(s) Taro YAMAZAKI et al.

It is certified that error appears in the above-identified patent and that said Letters Patent are hereby corrected as shown below:

Column 1, line 26, "is" second occurrence--delete--;
Column 1, line 34, "has been commonly used"--delete--;
Column 1, line 62, "singals" should read--signals--.

Column 2, line 15, "instensity" should read--intensity--.

Column 3, line 37, "This" should read--Thus--.

Column 4, line 32, "that"--delete--.

Signed and Sealed this

Twenty-third Day of May 1978

[SEAL]

Attest:

RUTH C. MASON
Attesting Officer

LUTRELLE F. PARKER
Acting Commissioner of Patents and Trademarks